United States Patent
Ripberger

(10) Patent No.: US 7,769,975 B2
(45) Date of Patent: Aug. 3, 2010

(54) METHOD FOR CONFIGURING VOLUMES IN A STORAGE SYSTEM

(75) Inventor: Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 10/990,050

(22) Filed: Nov. 15, 2004

(65) Prior Publication Data

US 2006/0107013 A1    May 18, 2006

(51) Int. Cl.
    *G06F 12/00* (2006.01)
(52) U.S. Cl. ...................... 711/170; 711/114
(58) Field of Classification Search .............. None
    See application file for complete search history.

(56) References Cited

U.S. PATENT DOCUMENTS

| | | | |
|---|---|---|---|
| 7,035,883 B2 * | 4/2006 | Kezuka et al. | 707/205 |
| 2002/0112113 A1 | 8/2002 | Karpoff et al. | |
| 2003/0079014 A1 | 4/2003 | Lubbers et al. | |
| 2004/0030668 A1 | 2/2004 | Pawlowski et al. | |
| 2004/0030822 A1 | 2/2004 | Rajan et al. | |
| 2007/0233952 A1 * | 10/2007 | Tanaka et al. | 711/114 |

FOREIGN PATENT DOCUMENTS

EP    1227402 A2 *    7/2002

* cited by examiner

*Primary Examiner*—Denise Tran
(74) *Attorney, Agent, or Firm*—David W. Victor; Konrad Raynes & Victor LLP

(57) ABSTRACT

Provided is a method for configuring volumes in a storage system. Information is provided on a plurality of storage device groups, wherein each storage group includes storage devices having common storage device attributes. Selection is received of at least one storage device group and an array type. An array is configured as the selected array type using storage devices included in the at least one selected storage group. Configured arrays are assigned to extent pools. A plurality of extents are configured in the extent pools, wherein each extent in one extent pool comprises a portion of one array assigned to the extent pool. A volume is configured to include at least one extent from one extent pool.

38 Claims, 7 Drawing Sheets

METHOD FOR CONFIGURING VOLUMES IN A STORAGE SYSTEM

BACKGROUND OF THE INVENTION

1. Field of the Invention

The present invention relates to a method, system, and program for configuring volumes in a storage system.

2. Description of the Related Art

In certain computing environments, multiple host systems may communicate with one or more control units, such as an IBM Enterprise Storage Server (ESS)®, for data in a storage device managed by the ESS receiving the request. The control unit manages access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc.

Typically, the storage devices managed by the control unit comprise numerous interconnected hard disk drives from which volumes are configured for the hosts to use. The storage devices may be configured as one or more arrays, such as RAID arrays, and the array storage space then assigned to volumes.

SUMMARY

Provided are a method, system, and program for configuring volumes in a storage system. Information is provided on a plurality of storage device groups, wherein each storage group includes storage devices having common storage device attributes. Selection is received of at least one storage device group and an array type. An array is configured as the selected array type using storage devices included in the at least one selected storage group. Configured arrays are assigned to extent pools. A plurality of extents are configured in the extent pools, wherein each extent in one extent pool comprises a portion of one array assigned to the extent pool. A volume is configured to include at least one extent from one extent pool.

DETAILED DESCRIPTION

Figure 1:
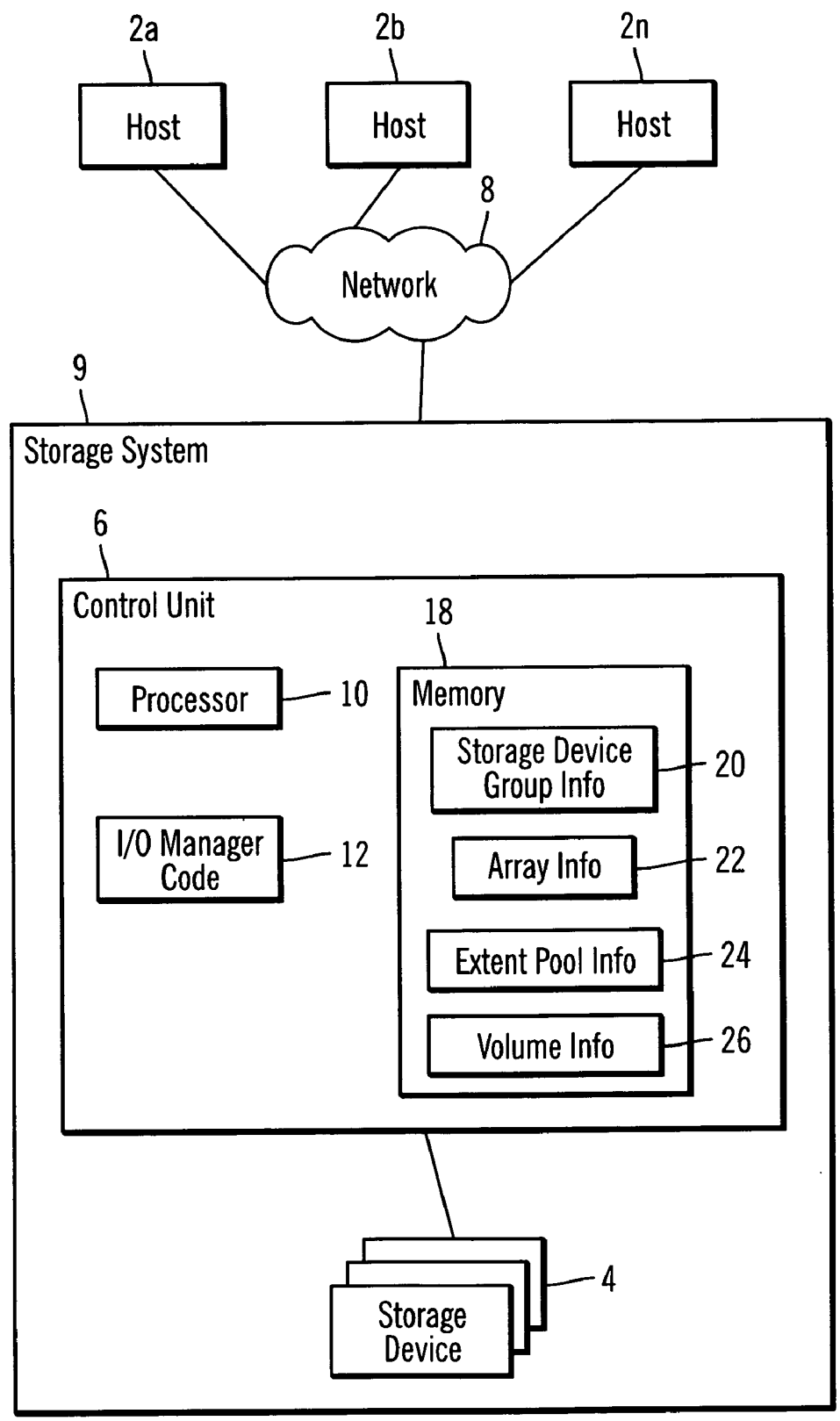
FIG. 1 illustrates an embodiment of a computing environment.

FIG. 1 illustrates an embodiment of a computing environment. Multiple hosts 2a, 2b . . . 2n communicate Input/Output (I/O) requests directed to volumes configured in one or more storage devices 4 to a control unit 6 over a network 8, where the control unit 6 manages access to the storage devices 4. The control unit 6 includes a processor 10 that executes I/O manager code 12 to configure and manage volumes in the storage systems 4. A volume comprises a logical representation of a section of the storage space configured on one or more storage devices 4 in the storage system 4 that may be accessed by the hosts 2a, 2b . . . 2n. The control unit 6 includes a memory 18, such as a non-volatile memory and information used to configure volumes in the storage devices 4. The I/O manager code 12 buffers updates and requested data as the data is being transferred between the hosts 2a, 2b . . . 2n and volumes 14a, 14b . . . 14n. The control unit 6 and storage devices 4 form a storage system 9.

In one embodiment, the control unit 6 maintains information on storage device groups 20 comprising information on groupings of the storage devices 4; arrays 22 including information on storage arrays configured from the storage devices 4; extent pools 24 comprising groupings of one or more arrays; and volumes 26 comprised of extents of storage space within one or more extent pools.

The hosts 2a, 2b . . . 2n may comprise computing systems capable of communicating I/O requests over a network, such as a server, workstation, desktop, mainframe, laptop, hand held computing device, telephony device, etc. The control unit 6 may comprise a storage server, mainframe, enterprise storage server, storage controller or other device used to manage I/O requests to connected storage devices 4. The storage devices 4 may comprise suitable storage devices known in the art, such as hard disk drives, which may be from different manufacturers and have different performance, reliability and interface attributes. The arrays may be configured from the storage devices 4 comprising interconnected hard disk drives in suitable configurations known in the art, such as DASD, RAID, JBOD, etc.

Figure 2:
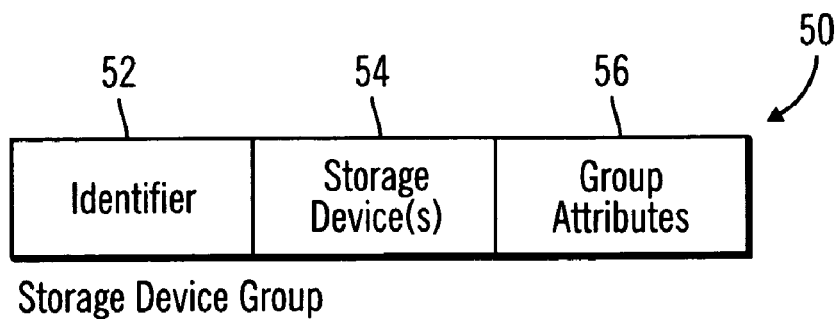
FIGS. 2, 3, 4, and 5 illustrates information maintained about storage device groups, arrays, extent pools, and volumes, respectively.

FIG. 2 illustrates storage device group information 50 maintained for each defined storage device group, including an identifier 52 of the storage device group, storage devices 54 assigned to the storage device group, and group attributes 56 of the storage devices assigned to the group. For instance, the storage devices 4 assigned to a group may have common attributes, such as the storage device capacity, performance (e.g., revolutions per minute (RPM), data transfer rates, etc.), disk reliability, interfaces, etc. The storage devices 4 assigned to a group may originate from different vendors. Storage devices 4 assigned to an array are typically automatically selected from the same storage device group so that the devices selected for the array have the same storage device characteristics, such as the same storage device capacity. In some embodiments, where the array configurations are constrained to certain array configurations, the storage device groups may be organized such that each storage device group is a candidate site for an array configuration, where the RAID configuration of the array is assigned to the storage group when the array is configured. If spare storage devices 4 are configured for one or more arrays, then the spares may also be selected from a given storage device group such that the spares have the appropriate device characteristics for the set of arrays for which they are functioning as a spare device.

Figure 3:
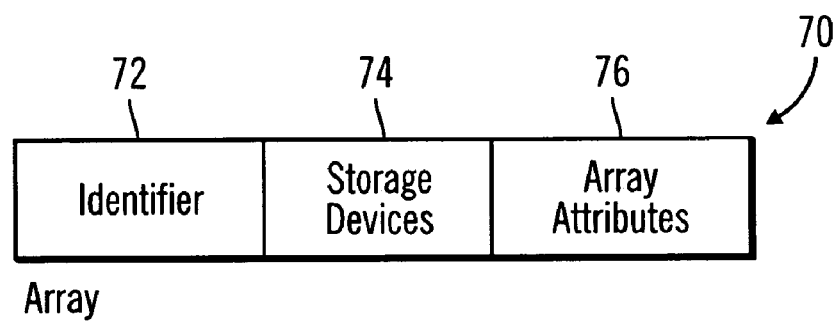

FIG. 3 illustrates array information 70 maintained for each array configured from the storage devices 4, including an array identifier 72, storage devices 74 configured in the array, and array attributes 76. The array attributes 76 may indicate the type of array configuration, e.g., RAID configuration and RAID level, and attributes of the storage devices used in the array configuration, such as performance, reliability, interfaces, etc. When there is a mix of storage device types in the array, the attributes maintained for the array for its storage devices is typically the attributes that a storage device would require in the event that another storage device replaced a failing device within the array. For example, the smallest capacity device in the array would determine the depth of the array and any substitute device would need to have at least that much capacity to be a suitable substitute.

Figure 4:
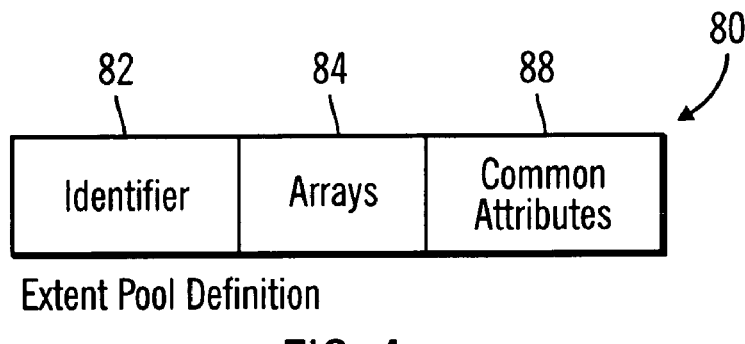

FIG. 4 illustrates an extent pool definition 80 for one defined extent pool, including an extent pool identifier 82; arrays assigned to the extent pool 84; and common attributes 88 for the extents in the extent pool. One attribute 88 of the extent pool that is always common is the fixed size of the extents within the extent pool. More than one extent size may be supported within the control unit, but each extent pool may have only one extent size. For instance, in one embodiment, the extent size might be one gigabyte ($2^{30}$ bytes). Each array assigned to the extent pool is divided into an integral number of extents. The mechanism for performing this division may be array dependent, such that each array may have a different capacity and provide a different number of extents. To the degree that the arrays within the extent pool share the common attributes such as RAID type, performance (RPM, interface type), etc., those attributes may be assigned to the extent pool in that all extents within the extent pool share those common characteristics.

Figure 5:
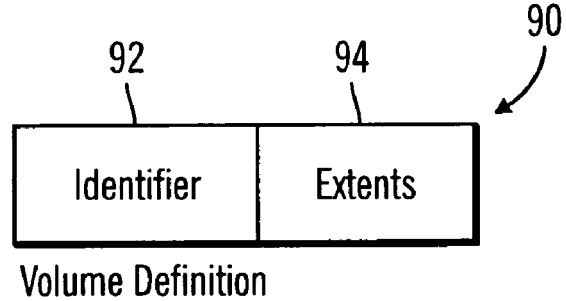

FIG. 5 illustrates volume information 90 provided for each configured volume including the volume identifier 92 and one or more extents 94 assigned to the volume.

Figure 6:
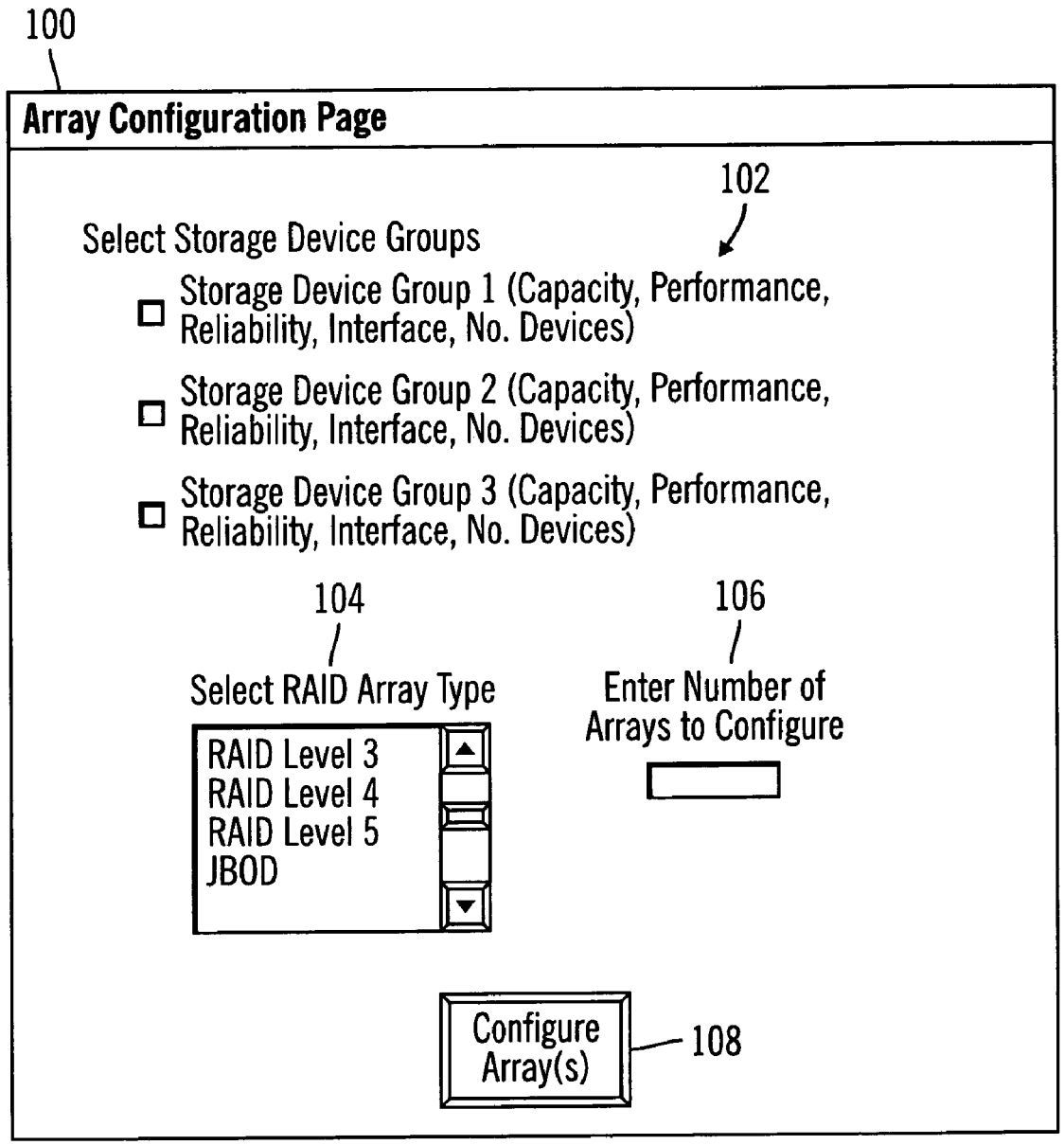
FIGS. 6, 7, and 8 illustrate graphical user interface (GUI) pages in which the user may enter information to configure arrays, extent pools, and volumes, respectively.

The I/O manager code 12 may present graphical user interface (GUI) pages to users, such as administrators or other users, of the control unit 6 or hosts 2a, 2b ... 2n to enable the user to configure storage device groups 20, arrays 22, extent pools 24, and volumes from extents in the extent pools 24. FIG. 6 illustrates an array configuration page 100 displaying storage device groups 102 that the user may select to use to configure an array. The displayed storage device groups 102 may comprise all storage device groups 50 (FIG. 2) having at least one storage device not already used in a configured array. The user may further select an array configuration type 104 and the number of arrays 106 to configure using the selected configuration type and the selected storage device groups 102. The user may select an array configuration button 108 to initiate the configuration using the entered parameters.

Figure 7:
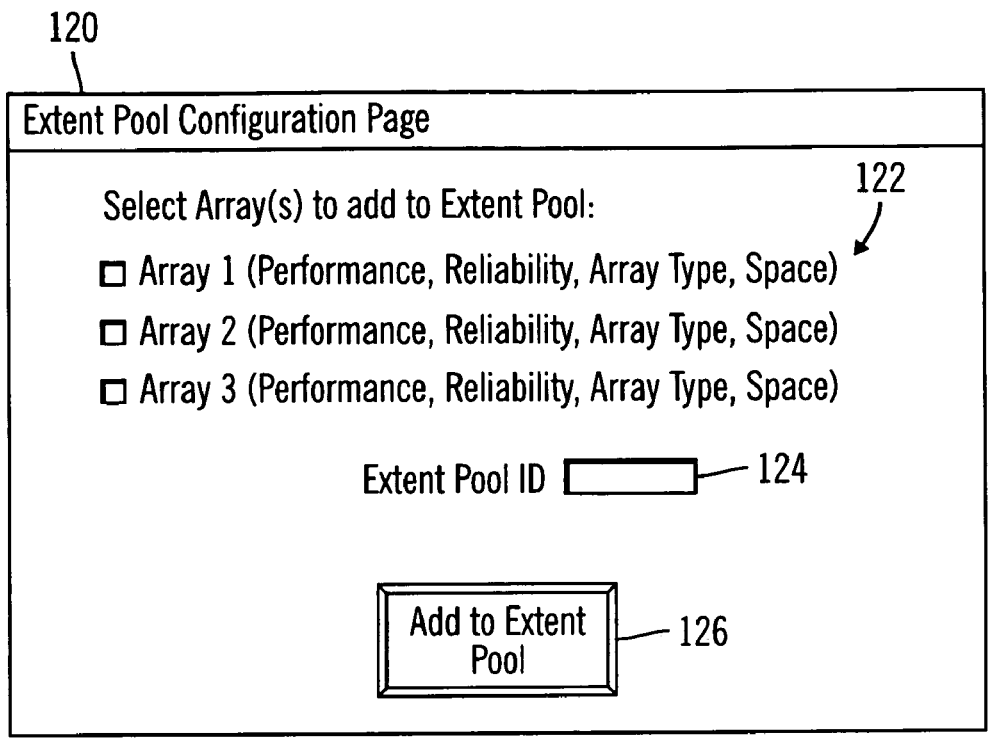

FIG. 7 illustrates an extent pool configuration page 120 in which the user may enter parameters to use to define extent pools. The user may select to assign one or more arrays displayed in the array section 122 to the extent pool identified in entry box 124 and then select button 126 to add the selected one or more arrays 122 to the extent pool identified in extent pool ID box 124. The array section 122 may display all arrays 122 not already assigned to an extent pool.

Figure 8:
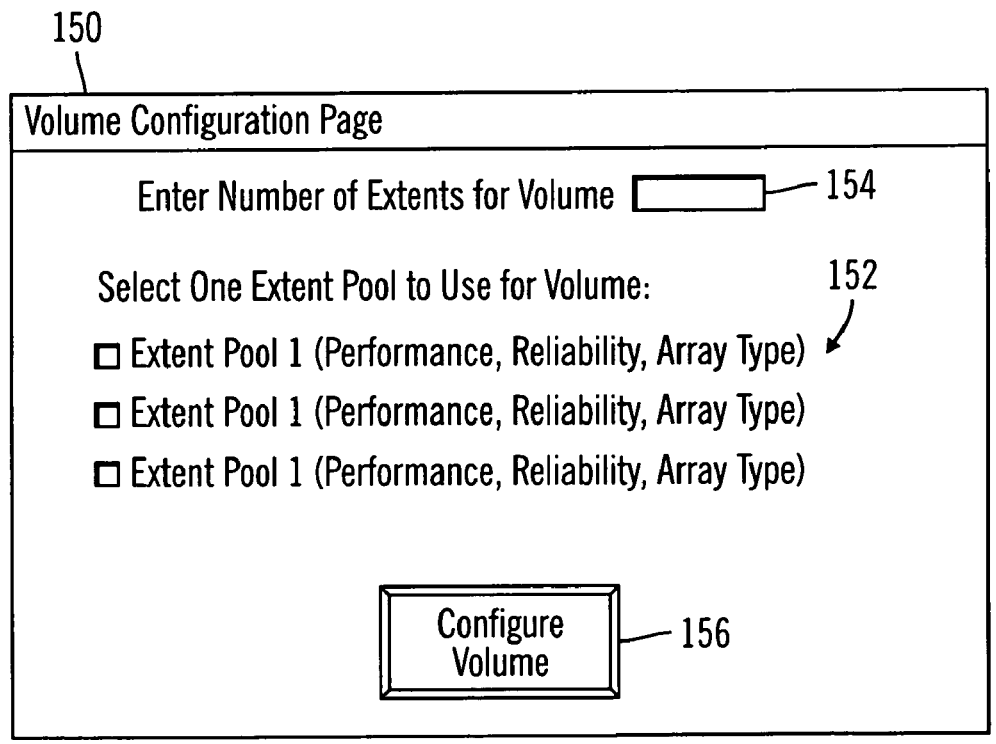

FIG. 8 illustrates a volume configuration page 150 in which the user may enter parameters to use to define volumes. One parameter specified for the volume is the number of extents 154 required to configure the volume. The user may select to use extents from one of the extent pools displayed in the extent pool section 152 in the volume being created. The extent pool section 152 may display all extent pools including one or more extents not assigned to a volume 90 (FIG. 5). The set of extents selected to configure the volume typically comes from one extent pool. Since the extent pool consists of the extents with certain common characteristics (such as performance, RAID type, drive reliability, etc.), a logical volume configured from extents within a single extent pool may have the same common characteristics as the extent pool. As such, the provisioning of volumes with certain storage characteristics may be simplified to selecting an appropriate extent pool to configure the volume within that extent pool. In one embodiment, the control unit automatically selects a set of unallocated extents for the volume from the extent pool. In another embodiment, the user may specify certain preferences for how the extents within the extent pool are selected, such as limiting the selection to certain arrays within the extent pool, avoiding certain arrays within the extent pool, or even specifying explicit extents to be used for the volume. At most, the number of arrays that a configured volume may be allocated across is limited to the arrays within the extent pool. As such, the user of the storage system can limit the exposure of an array failure to a limited number of volumes (i.e. the volumes that are configured within the extent pool containing the array). Managing placement of the volumes to specific arrays within the extent pool can further limit the impact of an array failure to a smaller set of configured volumes.

Figure 9:
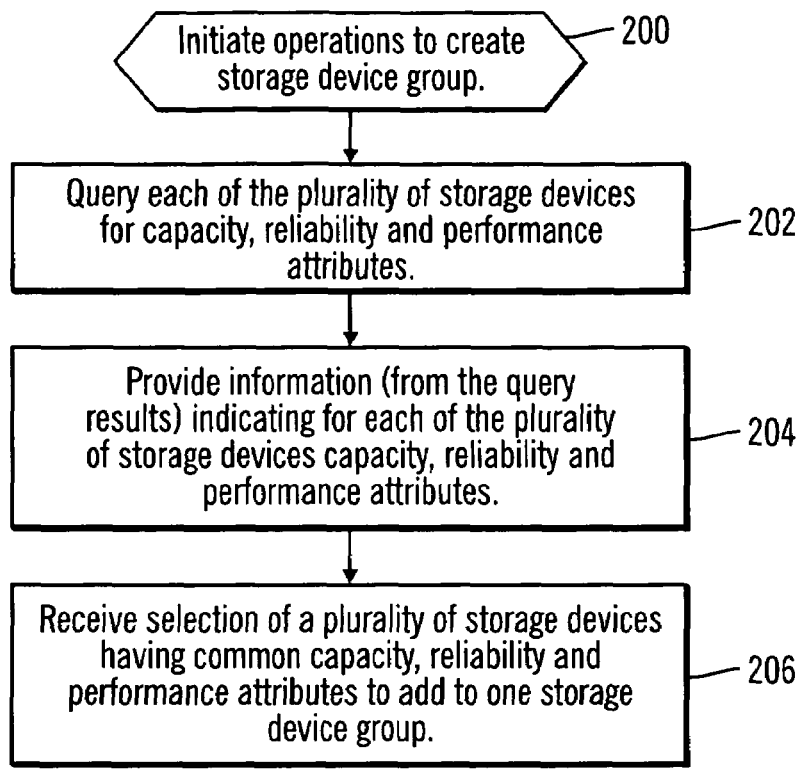
FIGS. 9, 10, 11, and 12 illustrates operations to define storage device groups, arrays, extent pools, and volumes, respectively.

FIG. 9 illustrates operations performed by the I/O manager 12 to define storage device groups 50. Prior to or in response to a user initiating (at block 200) operations to define storage device groups 50, the I/O manager 12 queries (at block 202) each of the plurality of storage devices 4 not already assigned to a storage device group 50 (FIG. 2) to determine capacity, reliability and performance attributes of unassigned devices 16. This gathered storage device information may be maintained in a table. Information from the query results indicating for each of the plurality of storage devices capacity, reliability and performance attributes is then provided (at block 204) to assist the user in defining storage device groups. Other attributes may also be queried, such as storage interface used, available storage space, etc. User selection is then received (at block 206) of storage devices 4 and the storage device group 50 is then configured with the selected storage devices 4. The user may select storage devices for one storage device group 50 having common capacity, reliability and performance attributes to provide a homogeneous group. Alternatively, the control unit 6 may automatically form storage device groups for the user by organizing groups for each unique set of device characteristics (e.g., capacity, reliability, performance, etc.).

Figure 10:
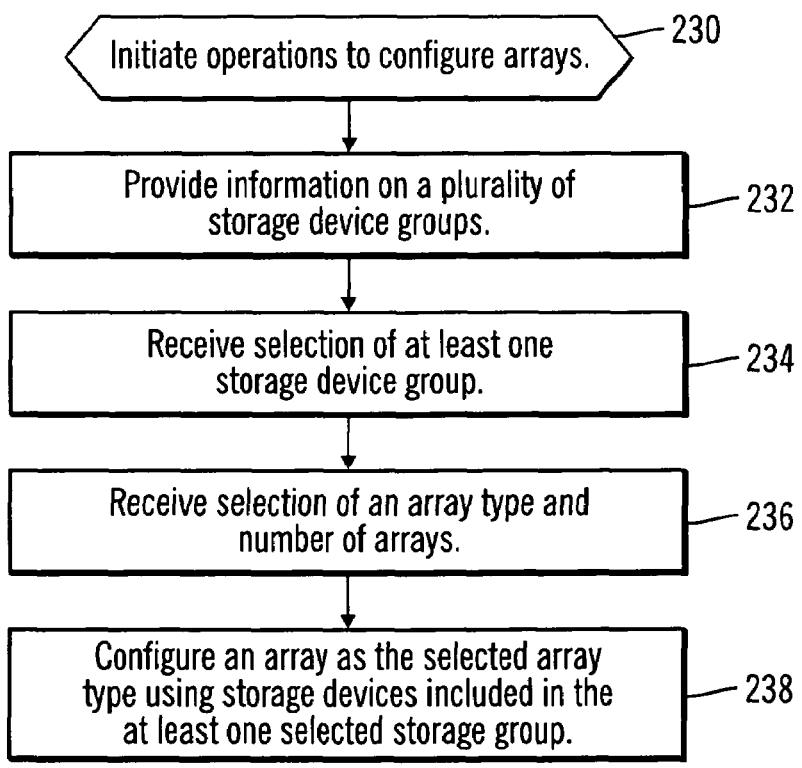

FIG. 10 illustrates operations performed by the I/O manager 12 to configure storage arrays from the storage devices 4 in response to user selections. Upon a user initiating (at block 230) operations to configure an array, information is provided (at block 232) on a plurality of storage device groups 50, where each storage device group 50 (FIG. 2) may include storage devices 4 having common storage device attributes. This information may be presented in the array configuration page 100 (FIG. 4). Upon receiving user selection (at block 234) of at least one storage device group 50, such as in storage device group selection area 102 of page 100 (FIG. 6), and selection (at block 236) of a number of arrays (in field 106) and array type (in list box 104), the I/O manager 12 configures (at block 238) an array to have the selected array type using storage devices identified in field 54 included in the at least one selected storage device group 50.

Figure 11:
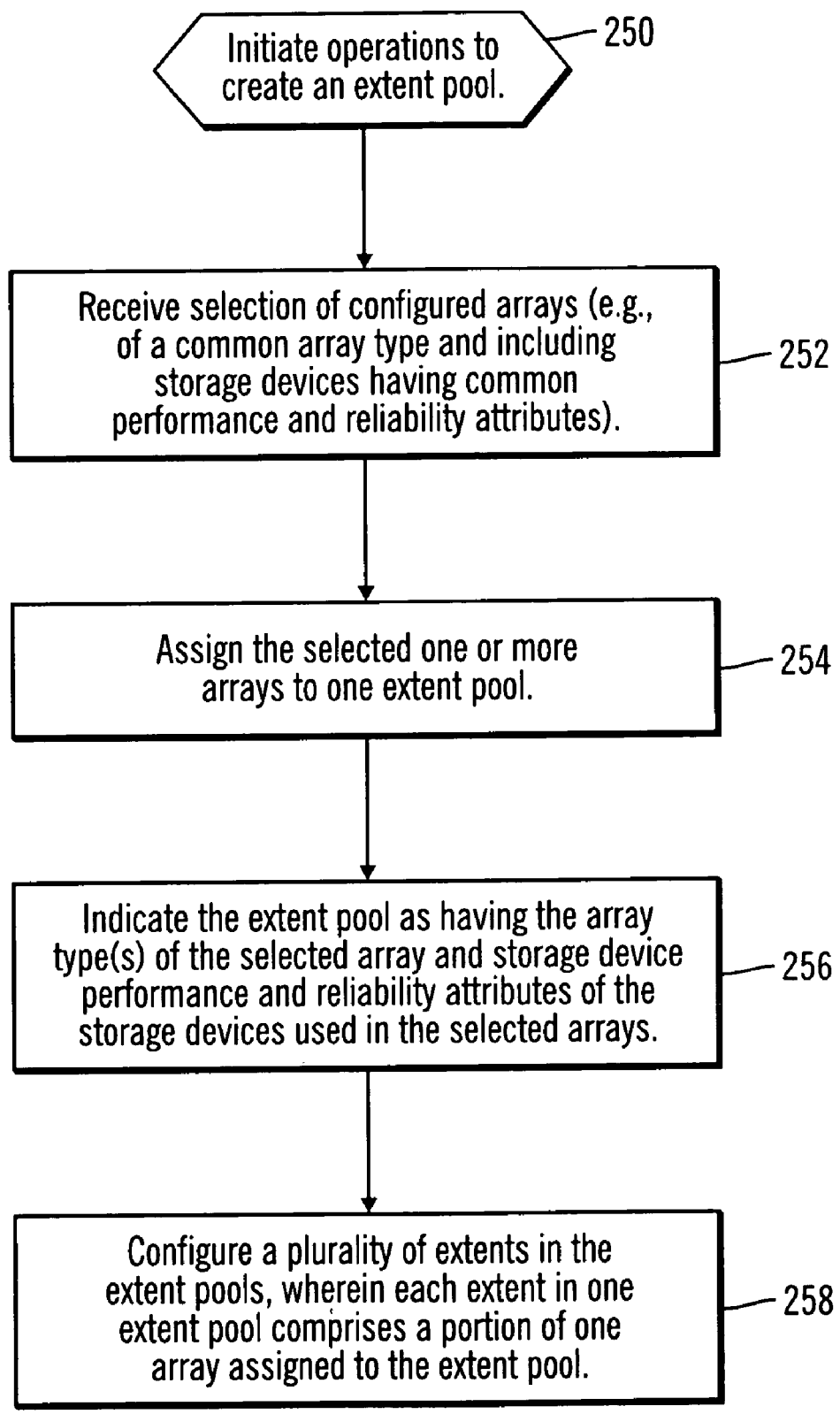

FIG. 11 illustrates operations performed by the I/O manager 12 to create an extent pool 80 (FIG. 4) in response to user selection. Upon initiating operations (at block 250) to create an extent pool 80, the I/O manager 12 receives (at block 252) selection of configured arrays from the array selection area 122 of the array configuration page 120 (FIG. 7). The user may select one array or multiple arrays having common attributes, such as a common array type and including storage devices having common performance and reliability attributes. Alternatively, the user may select arrays to include in the extent pool having heterogeneous attributes. The selected arrays are then assigned (at block 254) to the extent pool. The I/O manager 12 may further indicate (at block 256) in the common attribute 88 information for the extent pool created as having the array type(s) of the selected array(s) and storage device performance and reliability attributes of the storage devices used in the selected array(s). A plurality of extents are configured (at block 258) in the created extent pool, where each extent in one extent pool comprises a portion of one array assigned to the extent pool. The extent to array mapping 86 indicates how extents, which may have a fixed size, map to sections of the one or more arrays assigned to the extent pool 80.

Figure 12:
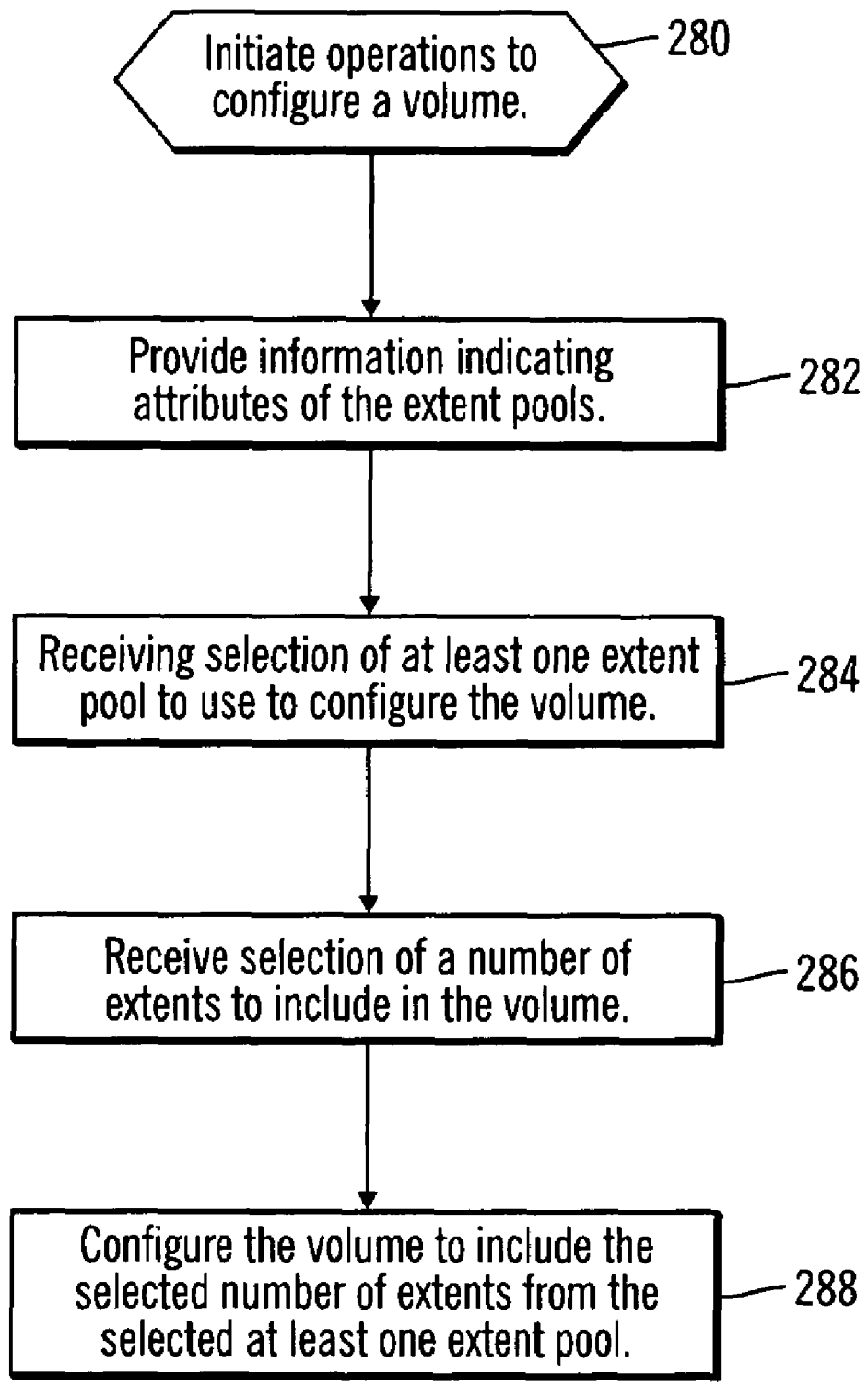

FIG. 12 illustrates operations performed by the I/O manager 12 to configure a volume 90 (FIG. 5) using extents in one or more selected extent pools. Upon initiating (at block 280) operations to configure a volume 90, the I/O manager 12 provides (at block 282) information indicating attributes of the extent pools, such as shown in the extent pool section 152 of the volume configuration page 150 (FIG. 8). The I/O manager 12 receives (at block 284) user selection of one extent pool to use to configure the volume, such as selection of one checkbox in the extent pool section 152 of the volume configuration page 150. In one embodiment, the user may be restricted to select only one extent pool to use to configure a volume, where a volume cannot include extents from multiple extent pools. In alternative embodiment, a volume may include extents from multiple extent pools. The I/O manager 12 further receives (at block 286) user selection of a number of extents to use to configure the volume, such as in the extent number field 154 or through the specification of a volume capacity that indirectly determines the number of extents required. The volume 90 is configured (at block 288) to include the selected number of extents from the selected at least one extent pool.

In one embodiment, the user may select to configure a volume to use extents in multiple arrays by selecting one extent pool that contains extents from multiple arrays for the volume configuration. The user may make an array selection to select extents based on the user array selection (e.g. from specific arrays, excluding specific arrays, by specifying specific extents, or by specifying some criteria for selecting the desired extents such as "All from any one array"). Alternatively, the user may allow the control unit to select the extents used to configure the volume. In either case, the user may control the set of arrays that the volume may be configured across by selecting which arrays are added to the extent pool when the extent pool is configured.

In one embodiment, the user may select a policy to use to select extent pools from which to configure a volume. If the user wants to configure a volume to maximize bandwidth, then the I/O manager may automatically configure the volume as including extents from an extent pool having multiple arrays, so the configured volume has extents spanning multiple arrays, which increases bandwidth. Alternatively, if the user wants to configure a volume to maximize reliability, then the I/O manager may automatically configure the volume as including extents from an extent pool having only one array, or may limit the selection of extents to a single array within a multi-array extent pool, so that the configured volume has extents from only a single array.

In further embodiments, where the user is configuring a source volume and target volume to replicate or backup the data in the source volume, the user may preferably configure the source and target volumes from different extent pools. This ensures that the source and target volumes are on different storage arrays, such that a failure of the underlying arrays forming the source volume does not also result in a failure of the target volume.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain embodiments may be directed to a method for deploying computing instructions by a person or automated processing integrating computer-readable code into a computing system, wherein the code in combination with the computing system is enabled to perform the operations of the described embodiments.

FIGS. 2-5 show certain information included in a storage device group, array, extent pool and volume. In alternative embodiments, this information may be stored in different data structures having different formats and information than shown. For instance, there may be a separate data structure associating arrays with extent pools to which they are assigned.

The illustrated operations of FIGS. 9-12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for defining a volume in a storage system, comprising:
   providing information on a plurality of storage device groups, wherein each storage group includes storage devices having common storage device attributes;
   receiving selection of at least one storage device group;
   receiving selection of an array type;
   configuring arrays as the selected array type using storage devices included in the at least one selected storage group;
   assigning the configured arrays to first and second extent pools, wherein multiple of the arrays are assigned to the first extent pool;
   configuring a plurality of extents in the first and second extent pools, wherein each extent configured in the first and second extent pools comprises a portion of one of the arrays assigned to the first and second extent pools, respectively, wherein the extents of the plurality of extents in the first extent pool comprise portions of the arrays assigned to the first extent pool;
   configuring a source volume from the extents in the first extent pool, wherein the extents configured in the source volume comprise portions from at least two of the arrays assigned to the first extent pool; and
   configuring a target volume from at least one extent in the second extent pool, wherein data from the source volume is copied to the target volume.

2. The method of claim 1, further comprising:
   providing information indicating for each of the plurality of storage devices capacity, reliability and performance attributes; and
   receiving selection of a plurality of storage devices having common capacity, reliability and performance attributes to add to one storage device group.

3. The method of claim 2, further comprising:
   querying each of the plurality of storage devices for capacity, reliability and performance attributes, wherein the provided information is obtained from responses to the querying of the storage devices.

4. The method of claim 2, further comprising:
   querying each of the plurality of storage devices for capacity, reliability, and performance attributes, wherein the provided information is used to automatically form storage device groups.

5. The method of claim 1, wherein the selected array type comprises a Redundant Array of Independent Disk (RAID) array level.

6. The method of claim 1, wherein storage devices from multiple storage device groups are used to configure the array, wherein the storage devices used to configure the array from the storage device groups may have different capacity, reliability and performance attributes.

7. The method of claim 1, wherein assigning the configured arrays to one extent pool further comprises:
   receiving selection of a plurality of the configured arrays of a common array type and including storage devices having common performance and reliability attributes, wherein the selected configured arrays are assigned to one of the first and second extent pools; and
   indicating the first or second extent pool to which the selected configured arrays are assigned as providing storage having as attributes the common array type and the common storage device performance and reliability attributes.

8. The method of claim 1, wherein each extent in the first and second extent pools has a fixed size.

9. The method of claim 1, wherein only one array is assigned to one of the first or second extent pool.

10. The method of claim 1, further comprising:
    providing information indicating attributes of the first and second extent pools; and
    receiving selection of at least one of the first and second extent pools to use to configure the volume, wherein the volume is configured from the extents in the selected at least one of the first and second extent pools.

11. The method of claim 10, further comprising:
    receiving selection of a number of extents to include in the volume, wherein the volume is configured to have the selected number of extents from the selected at least one of the first and second extent pools.

12. The method of claim 1, further comprising:
    receiving selection of a first policy or a second policy to use to configure a volume;
    selecting extents from one of the first or second extent pool having only one assigned array to configure the volume in response to selection of the first policy; and
    selecting extents from one of the first or second extent pool having multiple assigned arrays to configure the volume in response to selection of the second policy.

13. A method for deploying computing instructions, comprising integrating computer-readable code into a system, wherein the code in combination with the system is enabled to cause the system to perform:
    providing information on a plurality of storage device groups, wherein each storage group includes storage devices having common storage device attributes;
    receiving selection of at least one storage device group;
    receiving selection of an array type;
    configuring arrays as the selected array type using storage devices included in the at least one selected storage group;
    assigning the configured arrays to first and second extent pools, wherein multiple of the arrays are assigned to the first extent pool;
    configuring a plurality of extents in the first and second extent pools, wherein each extent configured in the first and second extent pools comprise a portion of one of the arrays assigned to the first and second extent pools, respectively, wherein the extents of the plurality of extents in the first extent pool comprise portions of the arrays assigned to the first extent pool; and
    configuring a source volume from the extents in the first extent pool, wherein the extents configured in the source volume comprise portions from at least two of the arrays assigned to the first extent pool; and
    configuring a target volume from at least one extent in the second extent pool, wherein data from the source volume is copied to the target volume.

14. The method of claim 13, wherein assigning configured arrays to one extent pool further comprises:
    receiving selection of a plurality of the configured arrays of a common array type and including storage devices having common capacity, performance and reliability attributes, wherein the selected configured arrays are assigned to one of the first and second extent pools; and
    indicating the first or second extent pool to which the selected configured arrays are assigned as providing storage having as attributes the common array type and the common storage device performance and reliability attributes.

15. A system for defining a volume in a storage system, comprising:
- storage devices;
- a processor in communication with the storage devices;
- a computer readable storage medium including code executed by the processor to perform operations, the operations comprising:
  - providing information on a plurality of storage device groups, wherein each storage group includes storage devices having common storage device attributes;
  - receiving selection of at least one storage device group;
  - receiving selection of an array type;
  - configuring arrays as the selected array type using storage devices included in the at least one selected storage group;
  - assigning the configured arrays to first and second extent pools, wherein multiple of the arrays are assigned to the first extent pool;
  - configuring a plurality of extents in the first and second extent pools, wherein each extent configured in the first and second extent pools comprise a portion of one of the arrays assigned to the first and second extent pools, respectively, wherein the extents of the plurality of extents in the first extent pool comprise portions of the arrays assigned to the first extent pool;
  - configuring a source volume from the extents in the first extent pool, wherein the extents configured in the source volume comprise portions from at least two of the arrays assigned to the first extent pool; and
  - configuring a target volume from at least one extent in the second extent pool, wherein data from the source volume is copied to the target volume.

16. The system of claim 15, wherein the operations further comprise:
- providing information indicating for each of the plurality of storage devices capacity, reliability and performance attributes; and
- receiving selection of a plurality of storage devices having common capacity, reliability and performance attributes to add to one storage device group.

17. The system of claim 16, wherein the operations further comprise: querying each of the plurality of storage devices for capacity, reliability and performance attributes, wherein the provided information is obtained from responses to the querying of the storage devices.

18. The system of claim 16, wherein the operations further comprise: querying each of the plurality of storage devices for capacity, reliability, and performance attributes, wherein the provided information is used to automatically form storage device groups.

19. The system of claim 15, wherein the selected array type comprises a Redundant Array of Independent Disk (RAID) array level.

20. The system of claim 15, wherein storage devices from multiple storage device groups are used to configure the array, wherein the storage devices used to configure the array from the storage device groups may have different capacity, reliability and performance attributes.

21. The system of claim 15, wherein assigning configured arrays to one extent pool further comprises:
- receiving selection of a plurality of the configured arrays of a common array type and including storage devices having common performance and reliability attributes, wherein the selected configured arrays are assigned to one of the first and second extent pools; and
- indicating the first or second extent pool to which the selected configured arrays are assigned as providing storage having as attributes the common array type and the common storage device performance and reliability attributes.

22. The system of claim 15, wherein each extent in the first and second extent pools has a fixed size.

23. The system of claim 15, wherein only one array is assigned to one of the first or second extent pool.

24. The system of claim 15, wherein the operations further comprise:
- providing information indicating attributes of the first and second extent pools; and
- receiving selection of at least one of the first and second extent pools to use to configure the volume, wherein the volume is configured from the extents in the selected at least one of the first and second extent pools.

25. The system of claim 24, wherein the operations further comprise:
- receiving selection of a number of extents to include in the volume, wherein the volume is configured to have the selected number of extents from the selected at least one of the first and second extent pools.

26. The system of claim 15, wherein the operations further comprise:
- receiving selection of a first policy or a second policy to use to configure a volume;
- selecting extents from one of the first or second extent pool having only one assigned array to configure the volume in response to selection of the first policy; and
- selecting extents from one of the first or second extent pool having multiple assigned arrays to configure the volume in response to selection of the second policy.

27. An article of manufacture comprising a computer readable storage medium having code executed by a processor for defining a volume in a storage system comprising storage devices, wherein the article of manufacture is capable of causing operations to be performed, the operations comprising:
- providing information on a plurality of storage device groups, wherein each storage group includes storage devices having common storage device attributes;
- receiving selection of at least one storage device group;
- receiving selection of an array type;
- configuring arrays as the selected array type using storage devices included in the at least one selected storage group;
- assigning the configured arrays to first and second extent pools, wherein multiple of the arrays are assigned to the first extent pool;
- configuring a plurality of extents in the first and second extent pools, wherein each extent configured in the first and second extent pools comprise a portion of one of the arrays assigned to the first and second extent pools, respectively, wherein the extents of the plurality of extents in the first extent pool comprise portions of the arrays assigned to the first extent pool;
- configuring a source volume from the extents in the first extent pool, wherein the extents configured in the source volume comprise portions from at least two of the arrays assigned to the first extent pool; and
- configuring a target volume from at least one extent in the second extent pool, wherein data from the source volume is copied to the target volume.

28. The article of manufacture of claim 27, wherein the operations further comprise:
- providing information indicating for each of the plurality of storage devices capacity, reliability and performance attributes; and receiving selection of a plurality of storage devices having common capacity, reliability and performance attributes to add to one storage device group.

29. The article of manufacture of claim 28, wherein the operations further comprise:
querying each of the plurality of storage devices for capacity, reliability and performance attributes, wherein the provided information is obtained from responses to the querying of the storage devices.

30. The article of manufacture of claim 28, wherein the operations further comprise:
querying each of the plurality of storage devices for capacity, reliability, and performance attributes, wherein the provided information is used to automatically form storage device groups.

31. The article of manufacture of claim 27, wherein the selected array type comprises a Redundant Array of Independent Disk (RAID) array level.

32. The article of manufacture of claim 27, wherein storage devices from multiple storage device groups are used to configure the array, wherein the storage devices used to configure the array from the storage device groups may have different capacity, reliability and performance attributes.

33. The article of manufacture of claim 27, wherein assigning configured arrays to one extent pool further comprises:
receiving selection of a plurality of the configured arrays of a common array type and including storage devices having common performance and reliability attributes, wherein the selected configured arrays are assigned to one of the first and second extent pools; and
indicating the first or second extent pool to which the selected configured arrays are assigned as providing storage having as attributes the common array type and the common storage device performance and reliability attributes.

34. The article of manufacture of claim 27, wherein each extent in the first or second extent pools has a fixed size.

35. The article of manufacture of claim 27, wherein only one array is assigned to one of the first or second extent pool.

36. The article of manufacture of claim 27, wherein the operations further comprise:
providing information indicating attributes of the first and second extent pools; and
receiving selection of at least one of the first and second extent pools to use to configure the volume, wherein the volume is configured from the extents in the selected at least one of the first and second extent pools.

37. The article of manufacture of claim 36, wherein the operations further comprise:
receiving selection of a number of extents to include in the volume, wherein the volume is configured to have the selected number of extents from the selected at least one of the first and second extent pools.

38. The article of manufacture of claim 27, wherein the operations further comprise:
receiving selection of a first policy or a second policy to use to configure a volume;
selecting extents from one of the first or second extent pool having only one assigned array to configure the volume in response to selection of the first policy; and
selecting extents from one of the first or second extent pool having multiple assigned arrays to configure the volume in response to selection of the second policy.

* * * * *